April 28, 1959  E. C. HARTLEY  2,883,705
METHOD OF AND APPARATUS FOR MOLDING RUBBER
AND RUBBER-LIKE ARTICLES
Filed Feb. 9, 1956  9 Sheets-Sheet 1

INVENTOR.
EMMETT C. HARTLEY
BY
Oberlin + Limbach
ATTORNEYS.

April 28, 1959 E. C. HARTLEY 2,883,705
METHOD OF AND APPARATUS FOR MOLDING RUBBER
AND RUBBER-LIKE ARTICLES
Filed Feb. 9, 1956 9 Sheets-Sheet 2

INVENTOR.
EMMETT C. HARTLEY
BY
Oberlin + Limbach
ATTORNEYS.

April 28, 1959  E. C. HARTLEY  2,883,705
METHOD OF AND APPARATUS FOR MOLDING RUBBER
AND RUBBER-LIKE ARTICLES
Filed Feb. 9, 1956  9 Sheets-Sheet 4

INVENTOR.
EMMETT C. HARTLEY
BY
Oberlin & Limbach
ATTORNEYS.

April 28, 1959 E. C. HARTLEY 2,883,705
METHOD OF AND APPARATUS FOR MOLDING RUBBER
AND RUBBER-LIKE ARTICLES
Filed Feb. 9, 1956 9 Sheets-Sheet 5

INVENTOR.
EMMETT C. HARTLEY
BY
Oberlin & Limbach
ATTORNEYS.

April 28, 1959 E. C. HARTLEY 2,883,705
METHOD OF AND APPARATUS FOR MOLDING RUBBER
AND RUBBER-LIKE ARTICLES
Filed Feb. 9, 1956 9 Sheets-Sheet 6

INVENTOR.
EMMETT C. HARTLEY
BY
Oberlin & Limbach
ATTORNEYS.

April 28, 1959

E. C. HARTLEY

2,883,705

METHOD OF AND APPARATUS FOR MOLDING RUBBER
AND RUBBER-LIKE ARTICLES

Filed Feb. 9, 1956

INVENTOR.
EMMETT C. HARTLEY
BY
Oberlin + Limbach
ATTORNEYS.

United States Patent Office 2,883,705
Patented Apr. 28, 1959

2,883,705

METHOD OF AND APPARATUS FOR MOLDING RUBBER AND RUBBER-LIKE ARTICLES

Emmett C. Hartley, Cleveland, Ohio, assignor to Parker-Hannifin Corporation, Cleveland, Ohio, a corporation of Ohio Application February 9, 1956, Serial No. 564,432

12 Claims. (Cl. 18—17)

This invention relates generally as indicated to a method of and apparatus for molding rubber and rubber-like articles and more particularly to a method and apparatus by and with which the production of such articles is carried on in an efficient and economical manner.

The present practice involves, for example, the unloading of cured articles from the mold and loading of uncured stock thereinto which usually takes up to two minutes' time, and then the loaded mold is placed into a curing press where, under the influence of heat and pressure, the stock is shaped and cured to form finished articles, such curing usually taking about eight minutes. Thus, the maximum productive capacity is about six loads/hour/press, and if one operator tends to two presses, it may be possible to cure twelve loads/hour, provided that the unloading and loading operations are staggered so that one press is set in operation during the curing of articles in the other press.

It is a primary object of this invention to provide a method and apparatus by which and with which production of cured rubber articles is substantially increased, for instance, to about thirty loads/hour; while only a single press is required, this being accomplished by splitting up the, say, ten-minute total cycle of load and cure into five equal time intervals of two minutes each, viz. two minutes for unload and load (as before), two minutes for initial size and cure under heat and pressure, and continued cure under heat for three successive two-minute periods. As an optional procedure, with which improved results are obtained in certain instances, the last two minutes of the cure may be done under both heat and pressure.

The foregoing object is achieved by having several molds in the apparatus at all times which are successively indexed at regular intervals from one stage to the next, there always being one mold idle for unloading and loading during one of such time intervals.

Another object of this invention is to provide a molding apparatus having a novel mold conveying or transporting mechanism.

Another object of this invention is to provide a molding apparatus having a novel mechanism for opening and closing molds of variable size.

Another object of this invention is to provide a molding apparatus having an automatic control system effective to perform successive functions when once started by a manual push button.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

*Molding apparatus generally (Figs. 1–6)*

In order that the nature of the invention may be readily comprehended, reference will first be made to the schematic diagrams, Figs. 1–6.

Figure 1:
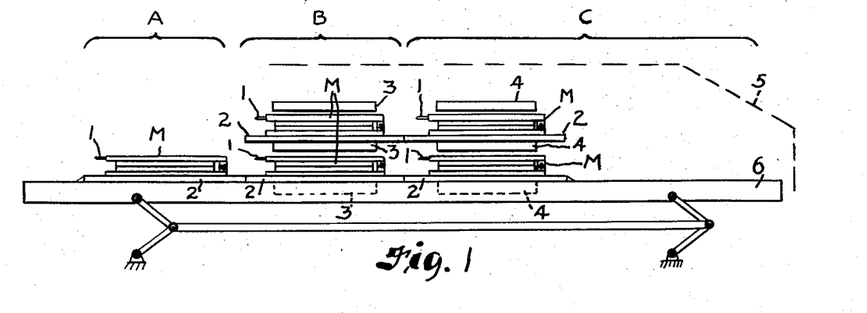
Figs. 1–6 are schematic diagrams showing the apparatus constituting the present invention in the successive positions which it assumes from the time that uncured stock is loaded into a mold for curing until the cured articles are unloaded from said mold.

As shown therein and identified in Fig. 1, the apparatus includes (1) a mold-unloading and loading zone A whereat molds are opened for unloading and loading, (2) a two-stage curing zone B (heat and pressure) whereat sizing of the stock and preliminary curing takes place and whereat final curing takes place, and (3) a heating chamber zone C whereat curing continues (after preliminary curing) under heat, without pressure.

Figure 6:
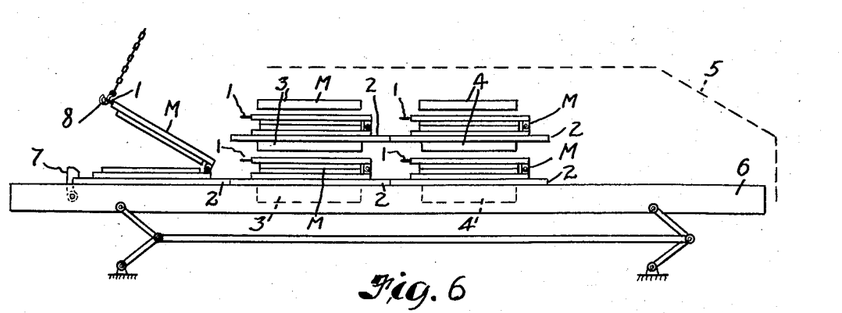

In the ensuing description of Figs. 1 and 6, and also of other figures of the drawings, reference is made to the two-stage curing zone B as involving not only sizing and preliminary curing under both heat and pressure, but also a final curing under heat and pressure. However, the final curing can, in most instances, be accomplished without pressure whereby this second stage of zone B, in effect, may constitute an extension of the heating chamber zone C, and to this end only one of the heating platens in zone B need be movable to apply heat and pressure only during the sizing and preliminary curing step.

The molds M, here shown as five in number, each comprises top and bottom sections which are hinged together at the rear, the front edge of the top section being provided with a handle 1 by which said top section may be swung upwardly to open position (see Fig. 6). The bottom section of each mold M is mounted by suitable clamps (not shown) to a mold-supporting plate 2 which herein is preferably of generally rectangular form. For reasons which will appear hereinafter, said plates are all of the same size, although the molds M may be of different lengths, widths, and thicknesses.

The curing zone B may comprise any familiar form of multiple platen molding or curing press which includes three heating platens 3, the top one of which is fixed and the middle and bottom ones of which are vertically movable.

The heating chamber zone C includes three vertically spaced-apart and relatively fixed heating platens 4, and a hood 5. The molds M in the zone C are heated by platens 4 and are maintained in heated condition as they are successively transferred from a position between the bottom and middle fixed heating platens 4 to a position between the middle and top fixed heating platens 4.

The plates 2 and the molds M thereon, when in the unloading and loading zone A and in the transfer portion of the heating chamber zone C, are supported on an elongated platform or frame 6 which carries mechanism for shoving the mold plates 2 and molds M supported thereon successively from zone A to zones B and C in one direction at one level, and then in the opposite direction at a different level from zone C to zones B and A.

In Fig. 1, there are shown five mold-supporting plates 2, one of which at the lower level is in the loading zone A, and two successive ones of which are in the curing and heating chamber zones B and C, and fourth and fifth ones of which at the higher level are also in the heating chamber and curing zones C and B respectively, the aforesaid three plates 2 being in edgewise abutting relation as are the fourth and fifth mold-supporting plates 2.

With the molds M in the positions shown in Fig. 1, the bottom and middle heating platens 3 of the molding press may be raised to apply heat and pressure to the stock in the second and fifth molds M to effect sizing and starting of the cure in the second mold and to effect the final cure in the fifth mold, this occurring while the operator loads uncured stock into the cavities of the first mold M.

During loading of the first mold M, the third and fourth molds are resting on the bottom and middle heating platens 4 of the heating chamber zone C, and are thus maintained in heated condition to continue the curing operation without pressure except that due to the weights of the top mold sections, it being noted that said third mold M is additionally heated by the middle heating platen 4 thereabove and that said fourth mold M is additionally heated by the top heating platen 4 thereabove.

Figure 3:
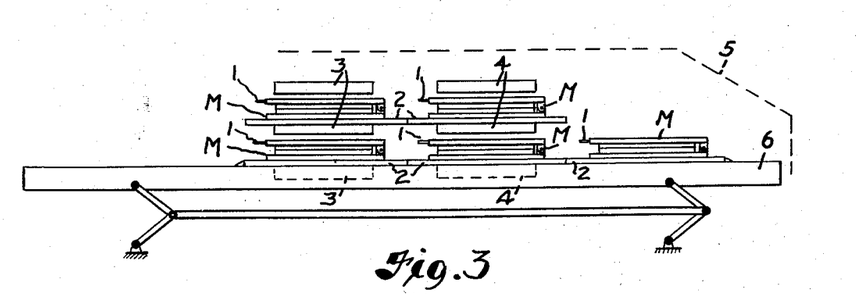

After the first mold M has been loaded, after the second and fifth molds M have been subjected to heat and pressure in zone B for a predetermined time interval, and after the bottom and middle platens 3 have been lowered, the three successive mold-supporting plates 2 and the molds M thereon at the lower level are shoved over to the right to the positions shown in Fig. 3. The movable heating platens 3 were, of course, previously moved downwardly to lower the second mold plate 2 to the same level as the first and third plates and to lower the fifth plate 2 to the same level as the fourth plate.

Figure 4:
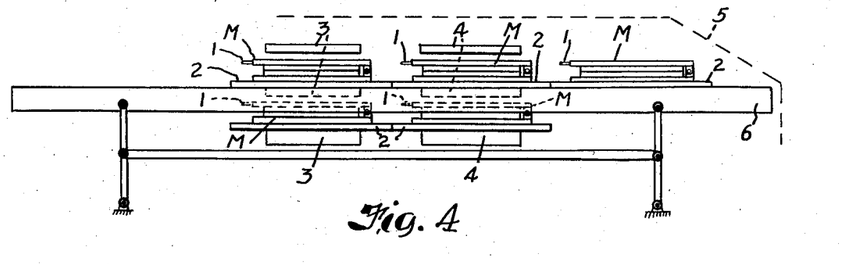
Figure 5:
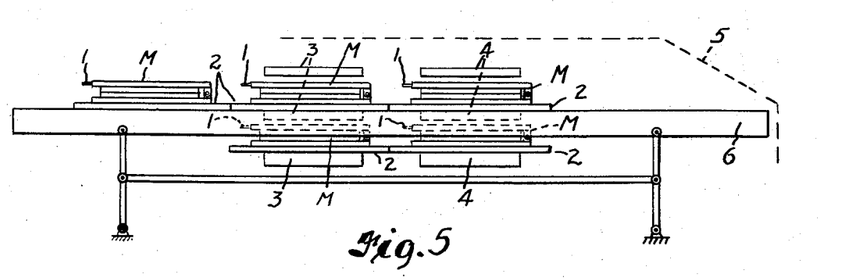

Thereafter, the transfer frame or platform 6 is raised as in Fig. 4 to elevate said third plate 2 (now at the righthand end of the platform) to the same level as the fourth and fifth plates whereupon when said third, fourth, and fifth plates are shoved to the left (see Fig. 5), the third and fourth plates will then be in the heating chamber and curing zones C and B respectively and the fifth plate 2, containing the cured articles, will be supported on the lefthand end of the platform or frame 6 as shown in Fig. 5.

The platform 6 is then lowered to the Fig. 6 position whereat a latch 7 engages the front edge of fifth plate 2 and a mold-opening hook 8 may be engaged in the handle 1 of said fifth mold M to swing the top section thereof as shown in Fig. 6 so that the operator may remove the cured articles and load uncured stock into said mold.

While the operator is thus unloading and loading said fifth mold M, the first and fourth molds are clamped between platens 3 in the curing zone B and the second and third molds are disposed in the heating chamber zone C.

By way of illustrative example, let it be assumed that the particular rubber stock which is being employed requires an eight-minute curing time. This curing time is divided into four two-minute periods as follows: two minutes for the initial sizing and initiation of the cure under heat and pressure between the bottom and middle of the heating platens 3 of the curing zone B; two successive two-minute curing periods wherein the cure is continued under heat in the heating chamber zone C; and a two-minute final cure under heat and pressure in the molding press between the top and middle platens 3 of the curing zone B.

Thus, by providing five plates 2 and five molds M, there will always be one mold M idle in zone A for a two-minute period for unloading of cured articles therefrom and for loading of uncured stock thereinto. With an apparatus and method as thus outlined, thirty complete molding cycles occur every hour which is considerably greater than can be achieved even with apparatuses wherein several molds are loaded (two minutes unload and load for each) and simultaneously clamped between several heating platens for the eight-minute cure.

Having described in general the essential characteristics of this apparatus and method, reference will now be made in detail to the Figs. 7–24 under the following headings: Curing Press, Heating Chamber, Mold Conveyor or Transfer Mechanism, Mold-Opening Mechanism, and Automatic Control Circuits. Then follows a step-by-step operation of the apparatus under the heading "Operation," such operation being described in greater detail than outlined above with reference to Figs. 1–6.

*Curing press (Figs. 7, 8, 9, and 22)*

As best shown in Figs. 7, 8, 9, and 22, and particularly the latter, the curing press 10 herein may be of any well known multi-platen type.

In the presently illustrated embodiment of the invention, said curing press 10 comprises a hydraulic cylinder 11 mounted on a base 12 and upstanding side plates 14 bolted together in parallel, spaced-apart relation to form a vertical guide for the bottom movable heating platen 3 which is raised by the piston in said cylinder 11 and a middle vertically movable heating platen 3, the bottom and middle heating platens being upwardly movable with respect to the top fixed heating platen 3 which is carried by a top head 15 of the press which is clamped between said side plates 14.

Figure 22:
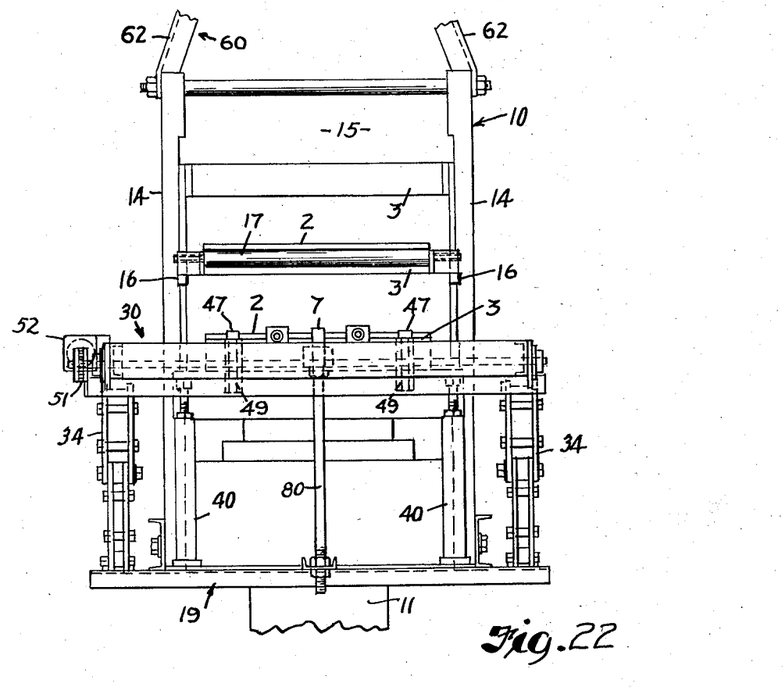
Fig. 22 is an end elevation view (on enlarged scale) of the apparatus as viewed from the lefthand end of Fig. 7.

The press in Fig. 22 is shown in its open position for receiving a mold-supporting plate 2 on the bottom heating platen 3 and other mold plate 2 on the middle platen 3, said middle platen being supported in the position shown by stop blocks 16 projecting laterally from the opposite sides of said side plates 14. As evident, when the piston in the cylinder 11 moves upwardly, the bottom platen 3 moves upwardly, raising the plate 2 and mold thereon (not shown in Fig. 22) into contact with the middle platen 3, whereupon the middle platen 3 moves up to raise the plate 2 and mold thereon into contact with the top fixed platen 3. In this way, the two molds on plates 2 are sandwiched between the three platens 3 whereby heat and pressure is applied on the stock in the cavities of the molds.

The bottom and middle movable platens 3 have transverse rolls 17 at each side which project slightly above the top surfaces of the respective platens to facilitate the shoving of mold plates 2 thereonto and therefrom, said rolls being cradled in said platens and raised as aforesaid by uprights 18 extending upwardly from a base structure 19, said base structure being secured to the curing press 10 and supported as on legs 20 at the heating chamber end of the apparatus.

*Heating chamber (Figs. 7, 8, and 9)*

The heating chamber as aforesaid includes three vertically spaced-apart platens 4 which are supported as on posts 25 in spaced relation so that the top surfaces of the bottom and middle ones are at the same level as the bottom and middle ones of the movable platens 3 when the latter are in their lowered positions; and, of course, the space between the fixed platens 4 is such as to accommodate molds therebetween containing rubber or rubber-like stock which is to be cured by application of heat to the molds.

The heating chamber extends beyond the three fixed platens 4 to include that portion of the apparatus wherein the mold plates 2 are transferred from a lower position between the bottom and middle fixed platens 4 to a position between the middle and top fixed platens, and preferably a heat shield or hood 5 on platform 6 will embrace the heating chamber so as to minimize the loss of heat and consequent cooling of the molds as they are thus transferred.

*Mold conveyor or transfer mechanism (Figs. 7–9, 11–16, 22 and 23)*

The mold conveyor or transfer mechanism is herein shown in the form of a longitudinally extending, vertically movable platform or frame 6 which straddles the curing press 10 and the fixed platen portion of the heating chamber to provide at one end a loading platform 30 and at the other end a transfer platform 31.

Figure 7:
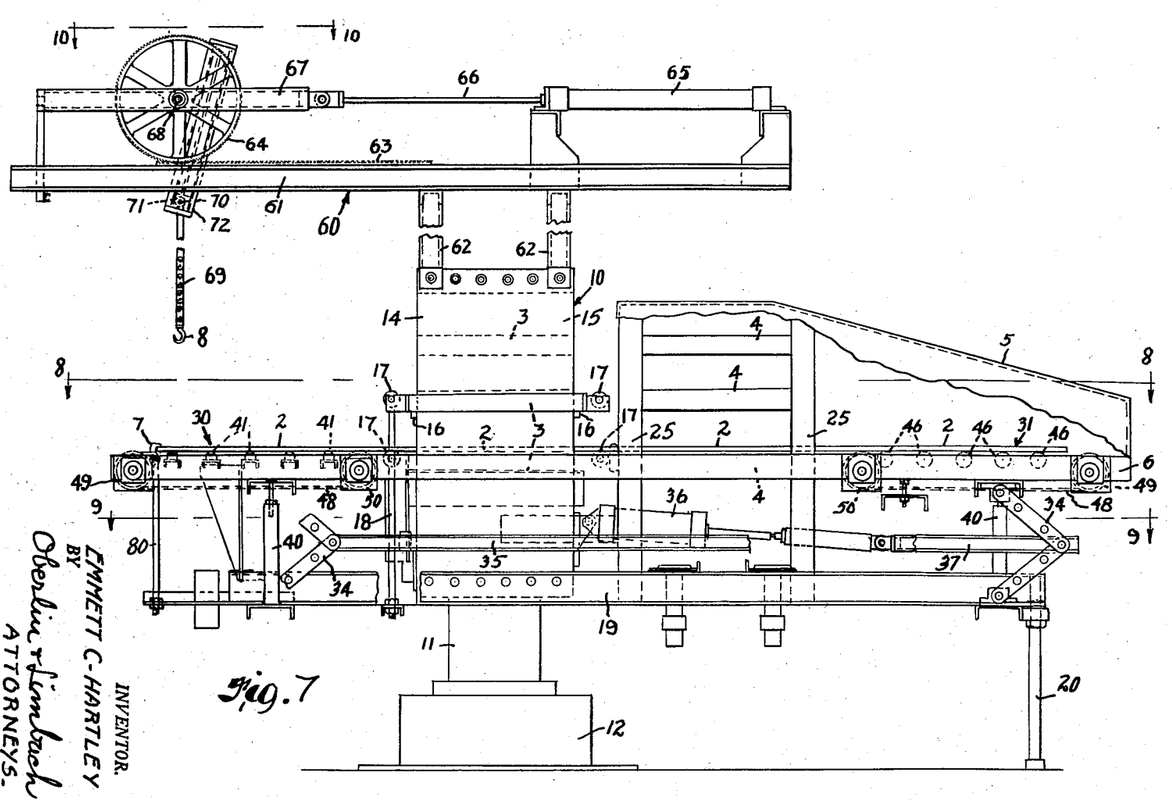
Fig. 7 is a side elevation view of a preferred form of apparatus.

Said frame 6 is supported for vertical movement as by means of guides 32 engaging the opposite edges of the side plates 14 (see Fig. 8), and vertical movement is imparted as by the toggle linkages 34, which when the links thereof are angularly related as in Fig. 7, the frame 6 is in the lowered position; and which, when the links are aligned (see Figs. 4 and 5), the frame 6 is in the raised position.

In the present embodiment of the invention, four such linkages 34 are provided adjacent the corners of the platform 6, and the pairs of linkages 34 on opposite sides are joined together at the knee joints by longitudinally extending side members 35. Actuation of the linkages 34 as aforesaid is achieved as by means of a hydraulic cylinder 36 which is pivotally mounted on a bracket of the curing press and which has its piston rod linked to a crosshead 37 connected to the knee joints of the linkages 34 at the heating chamber end of the platform 6. Obviously, other equivalent means may be employed for straightening the toggle linkages 34 to raise the platform 6 and to break the toggle linkages 34 to lower the platform.

The lowermost level position of the platform 6 is determined by adjustable posts 40 extending upwardly from adjacent the corners of the base structure 19 engaging cross-beams of the platform 6.

Figure 8:
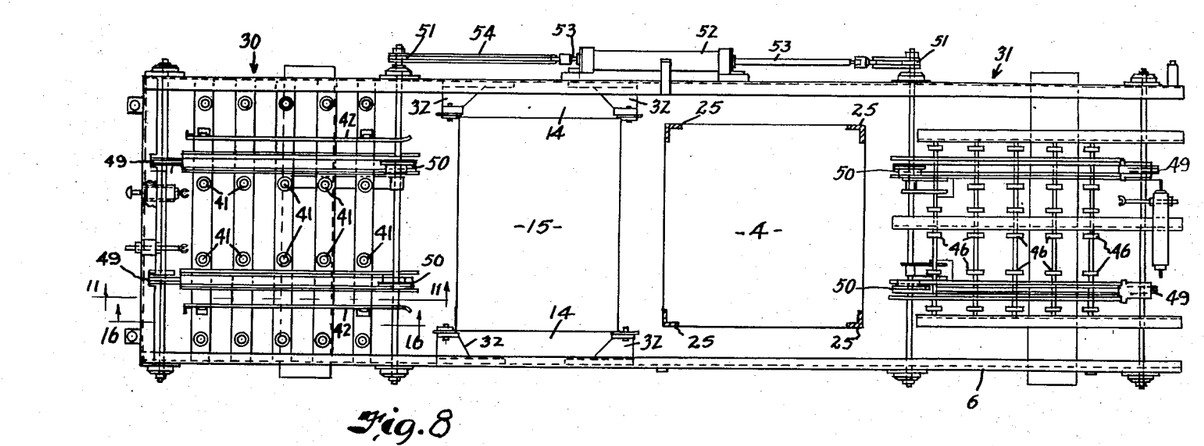
Figs. 8, 9, and 10 are plan views, Fig. 10 being enlarged, as viewed substantially along the respective lines 8—8, 9—9, and 10—10, Fig. 7.
Figure 9:
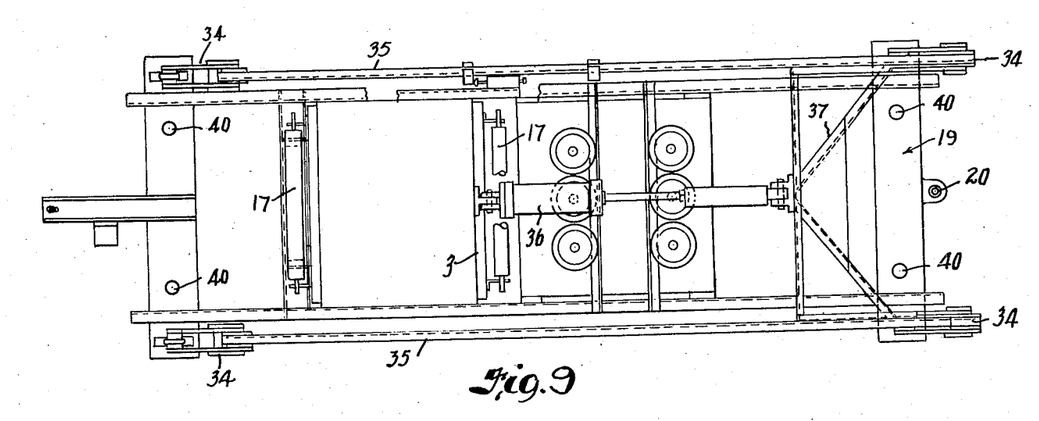
Figure 10:
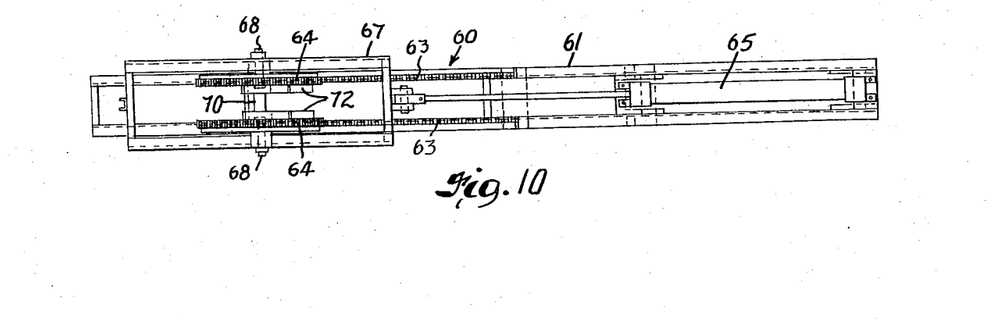
Figure 11:
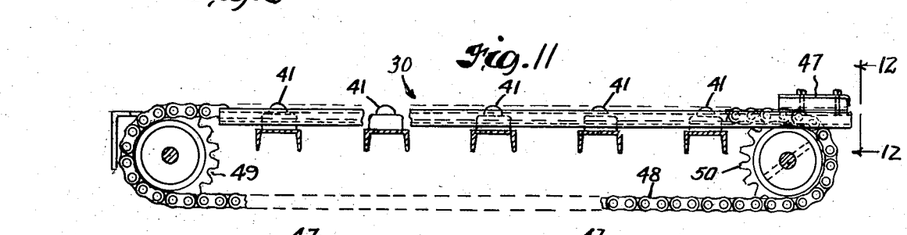
Fig. 11 is a fragmentary longitudinal cross-section view of the mold conveying frame or platform, such section having been taken substantially along the line 11—11, Fig. 8.
Figure 16:
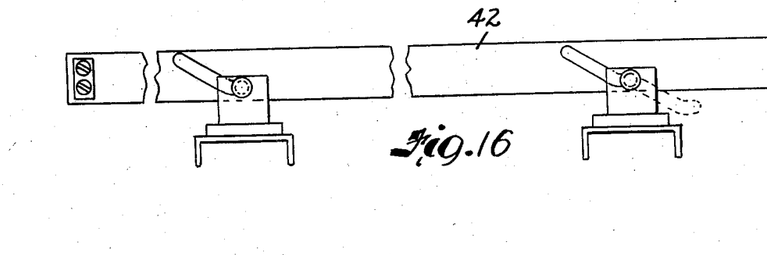
Fig. 16 is a side elevation view of one of the adjustable mold-supporting plate guides as viewed along the line 16—16, Fig. 8.

The loading end 30 of said platform 6 comprises a plurality of cross-pieces carrying thereon anti-friction means, for instance, the ball castors 41 which are clearly shown in Figs. 7, 8, and 11. At this end of the platform there are a pair of parallel guide strips 42 which, as shown in Fig. 16, are vertically adjustable so as to embrace the opposite sides of the mold-supporting plates 2 which are adapted to be successively positioned on said end of the platform 6 for thus guiding said plates onto platform 6 and for guiding the movement of the mold plates 2 therefrom into the curing press 10. Moreover, by lowering the strips 42, removal of plates 2 and molds M is facilitated.

Figures 23, 24:
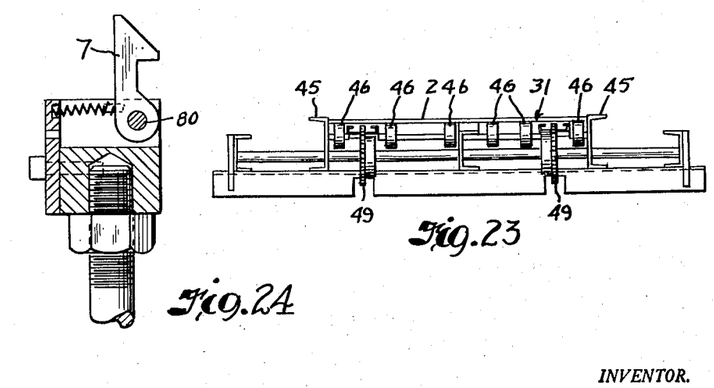
Fig. 23 is an end elevation view of the mold-elevating end portion of the mold-conveying platform as viewed from the righthand end of Fig. 7.
Fig. 24 is a cross-section view of a latch provided at the unloading-loading end of the platform for holding down the mold-supporting plate thereat so that the mold on said plate may be opened to remove the cured articles therefrom and to load uncured stock thereinto.

At the other end 31 of the platform 6, that is, the heating chamber end thereof, there are also provided spaced-apart guides 45 for the mold plates 2 as best shown in Fig. 23, and instead of the ball castors 41, there are here shown a plurality of rows of rollers 46 mounted on transverse shafts on which the mold-supporting plates 2 are adapted to be freely moved first to the left and then to the right as hereinafter explained.

Mold-supporting plates 2 are adapted to be moved from the loading end 30 of the platform 6 into the curing press 10 and from the heating chamber end 31 of the platform 6 into the heating chamber between the top and middle fixed platens 4 as by means of chain-driven pusher blocks 47, there being a pair of pusher blocks 47 at each end of the platform 6.

Figure 12:
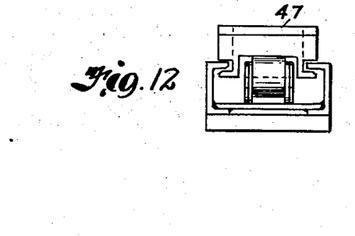
Fig. 12 is an end elevation view of one of the mold pusher blocks as viewed along the line 12—12, Fig. 11.
Figure 13:
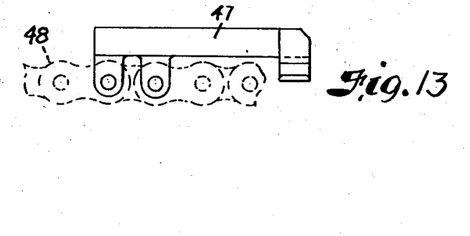
Fig. 13 is a side elevation view of the Fig. 12 mold pusher block.
Figure 14:
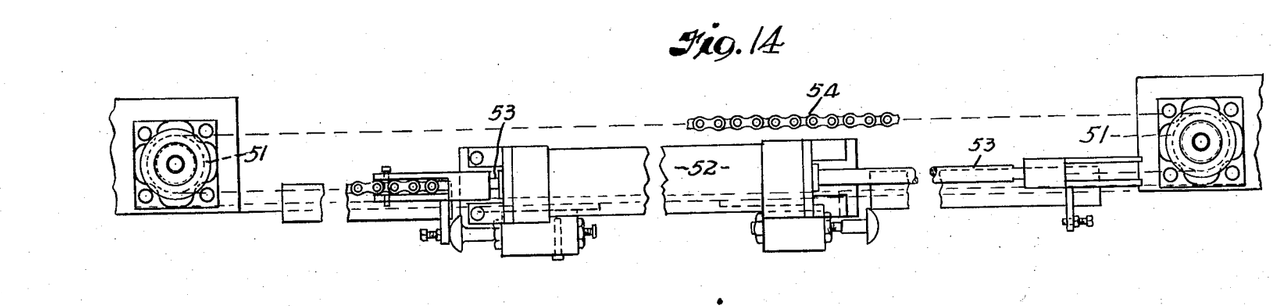
Figs. 14 and 15 are respectively rear elevation and top plan views showing the mechanism for actuating the mold pusher blocks.
Figure 15:
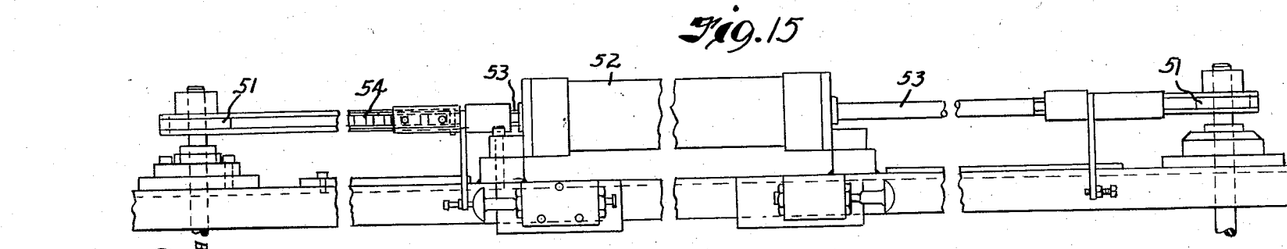

The chains 48 on which said pusher blocks 47 are mounted in the manner shown in Figs. 11, 12, and 13, are trained over sprocket wheels 49—50, the inner ones 50 of said wheels in turn being driven by means of sprocket wheels 51—51, the latter being rotated by means of a double-acting hydraulic cylinder 52 provided with a double-ended piston, the ends of the opposite piston rods 53 being linked to the ends of a single length of chain 54 which extends from the end of one piston rod 53 around one sprocket wheel 51 and thence around the other sprocket wheel 51 to the end of the other piston rod 53. This mechanism is most clearly illustrated in Figs. 14 and 15, it being apparent that the respective pairs of pusher blocks 47 are thus moved in unison in opposite directions in spaced-apart relation corresponding to the longitudinal dimension of, for example, three abutting mold-supporting plates 2.

Assuming that there are three mold-supporting plates 2 in a row abutting each other, the pusher blocks 47 at the lefthand edge of the first mold-supporting plate 2 will engage said plate and push all three plates toward the right when the sprocket wheels 49—50 are rotated in a clockwise direction as viewed in Fig. 7. At the same time, the other set of pusher blocks 47 will engage the righthand edge of the third mold-supporting plate 2 and will move in unison with the first set of pusher blocks 47 as the sprocket wheels 49—50 at the righthand end of the platform 6 are rotated also in a clockwise direction by reason of the movement of the piston in the cylinder 52 from left to right as viewed in Fig. 8.

Then, of course, when the platform 6 is in its raised position, the reversal of the piston in said cylinder 52 will cause the pusher blocks 47 at the right to push the aforesaid third mold-supporting plate 2 toward the left while the in-between plates 2 which are in the heating chamber between the top and middle fixed platens 4 and between the top and middle platens 3 of the curing press 10, are shoved by said third plate 2, the lefthand pusher blocks 47 being engaged with the lefthand edge of the mold plate 2 in the press and thus these three plates 2 in the upper position are shifted leftward with the plate 2 in the press transferred onto the loading end 30 of the platform between the guide strips 42.

The movements of the piston in the cylinder 52 effect certain automatic controls as will be described in detail under the heading "Operation" and also under the heading "Automatic Control Circuits."

*Mold-opening mechanism (Figs. 7, 10, 18–21, and 24)*

The mold-opening mechanism 60 is mounted above the mold conveyor or transfer mechanism and includes a longitudinally extending beam 61 which is supported as on posts 62 secured at the top of the curing press 10, said beam being provided with parallel longitudinally extending gear racks 63 with which a pair of spaced-apart gears 64 are in mesh.

At the righthand end of said beam 61 is a longitudinally extending hydraulic cylinder 65, the piston rod 66 of which is linked to the box frame 67 which carries the axles 68 for gears 64 so as to cause the latter to rotate about their axes to cause the lifting hook 8 to be raised. Said hook 8 is mounted at the lower end of a length of chain 69, the upper end of which is pivotally connected to a cross pin 70 on a pair of blocks 71 which are longitudinally slidable in slideways 72 attached inside the respective gears 64.

Springs 73 in said slideways 72 are operative to normally press the cross pin blocks 71 against the lower end walls of the slideways; and, therefore, the initial opening of a mold (with tremendous force multiplication) is achieved during the initial portion of the clockwise rotation of the gears 64 from the position shown in Fig. 7, while the blocks 71 are in metal-to-metal abutting engagement with the lower ends of said slideways 72.

As apparent, when the gears 64 continue to rotate clockwise, the slideways 72 will be swung around so that the blocks 71 are at the top, and in this position the springs 63 may be compressed so that the hook 8 may follow any desired arcuate path corresponding to the path of movement of the mold handle 1 about its hinged connection.

It will be appreciated that molds M are of varying size and thickness; and, therefore, the handles 1 thereof will strike arcs of different radii, and it is the spring action on the slide blocks 71 which accommodates movement of the hook 8 through paths of different radii after the slideways 72 have been swung so that the mold-opening load has a force component in an axial direction relative to the springs 73.

Projecting upwardly from the base structure 19 is a rod 80 which carries the spring-actuated latch 7 (see Fig. 24 especially), and when the platform 6 is moved to its bottom position with a mold plate 2 on the loading end 30 thereof, said latch 7 will engage the lefthand edge of said plate 2 so that the hook 8 of the mold-opening mechanism may be engaged with the handle 1 of the top section of the mold M to open the mold by drawing the hook 8 upwardly by the mechanism above described. The latch 7 thus holds the plate 2 down against the loading end 30 of the platform 6.

When it is desired to shift the mold-supporting plate 2 toward the right, the pusher blocks 47 merely engage the lefthand edge thereof and said plate is free to move toward the right with respect to the latch 7.

*Automatic control circuits (Fig. 17)*

Some of the control valves, etc. are shown in the other figures of the drawings, but for sake of clarity, the fluid lines have been omitted. A complete schematic piping and wiring diagram will be found in Fig. 17. Therefore, reference will be made now exclusively to Fig. 17 in connection with the automatic fluid pressure operation of the present molding apparatus. Of course, Fig. 17 shows, schematically at least, the mold conveyor or transfer mechanism and the mold-opening mechanism as well as the molding press and the heating chamber.

Figure 17:
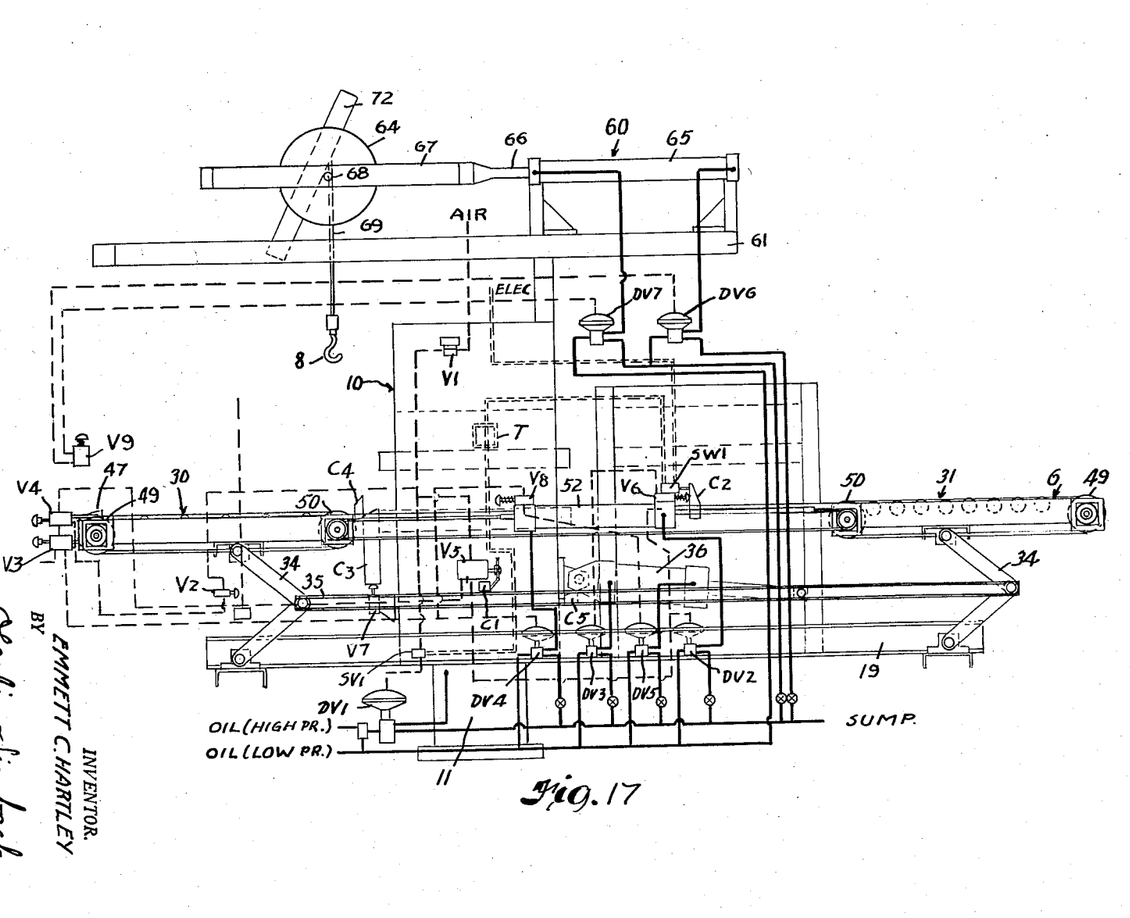
Fig. 17 is a schematic piping and wiring diagram by which automatic operation of the molding apparatus herein is achieved.
Figure 18:
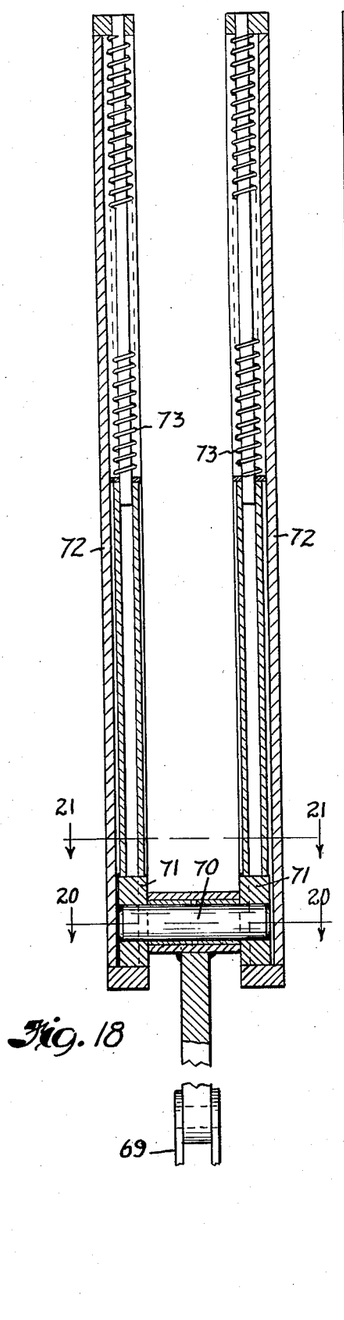
Fig. 18 is a cross-section view of a portion of the mold-opening mechanism taken substantially along the line 18—18, Fig. 19.
Figures 19, 20, 21:
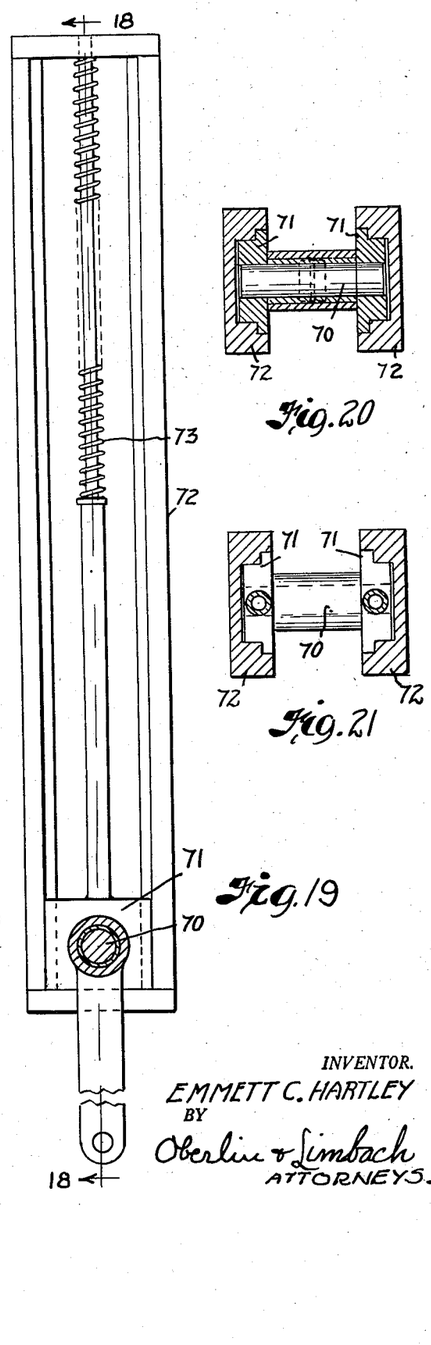
Fig. 19 is a side elevation view as viewed from the righthand side of Fig. 18.
Figs. 20 and 21 are cross-section views taken respectively along the lines 20—20 and 21—21, Fig. 18.

In Fig. 17 the single dotted lines are air pressure lines, the double dotted lines are electric leads, and the heavy solid lines are oil pressure lines, there being a high pressure oil line, a low pressure oil line, and an oil return line to the sump or reservoir, so labeled in the drawing.

Starting at the air line labeled "Air," there is first a pressure regulator VI from which air at the regulated pressure flows to several places, viz.

(1) To spring closed two-way valve V2 which is opened, when the adjacent toggle links 34 are aligned, to supply air to push out the plungers of the two series connected two-way valves V3 and V4 which is spring closed to block air flow therethrough and to vent the plunger chambers of V3 and V4 when the adjacent toggle links are broken, the plungers remaining in pushed-out position until manually pushed in by the operator;

(2) To solenoid valve SV1 which, when energized by the timer T, supplies air to diaphragm-operated hydraulic valve DV1 whereby low pressure oil is connected to the cylinder 11 of the curing press 10 and which, when de-energized, cuts off air supply to DV1 whereby oil in said curing press cylinder 11 is returned to the sump; and (3) To four-way valve V5, the spool of which is moved to the right by cam C1 (mounted on platform 6, raising and lowering mechanism) to conduct regulated air pressure to V4, and to vent diaphragm-operated valve DV2 whereby the righthand end of transfer cylinder 52 is connected to the sump line and further to vent diaphragm-operated valve DV3 (via two-way, spring-closed cam C2 opened, valve V6) whereby the left hand end of the toggle-actuating cylinder 36 is connected to the sump line. Cam C2 is mounted on the right piston rod 53 of transfer cylinder.

The air line between V5 and V4 connects to two-way spring-closed valve V7 which is opened by cam C3 on the bottom movable platen 3 in the down position of said platen whereby pushing in of the plungers of valves V3 and V4 performs no function except when the platens 3 are in down position ready for shoving of a loaded mold between the bottom and middle platens 3.

When the series connected valves V3 and V4 are opened by manually pushing in the plungers thereof, the regulated air pressure actuates the diaphragm-operated valve DV4 so that low pressure oil flows into the lefthand end of the transversing cylinder 52, thereby causing movement of the pusher blocks 47 from left to right and corresponding movement of the three mold-supporting plates 2 therebetween, the first plate 2 being shoved into the curing press 10, the second plate 2 being shoved into the heating chamber, and the third plate 2 being shoved onto the righthand end 31 of the platform 6.

Just before the piston in traversing cylinder 52 reaches the righthand end of its stroke, the cam C4 on the lefthand piston rod 53 opens spring closed, two-way valve V8 which, in turn, allows regulated air pressure from V4 to flow into diaphragm-operated valve DV5 whereby low pressure oil flows into the righthand end of the toggle-actuating cylinder 36 to raise the platform 6 and the third plate 2 which had just been shoved onto the righthand end 31.

As the platform 6 reaches its raised position wherein said third plate 2 is in the same plane as the two plates 2 on the middle fixed and middle movable platens 4 and 3, one of the toggle linkages 34 actuates V2, as already described, to push out the plungers of V3 and V4. At the same time, cam C5 on the toggle actuator mechanism moves the spool of V5 to the left, thereby blocking air flow to V3 and conducting air pressure to DV2. DV2 is thereby operated to conduct low pressure oil into the righthand end of the traversing cylinder 52 whereby the pusher blocks 47 shove the top three plates 2 to the left onto the left end 30 of the platform 6, onto the middle platen 3 of the curing press and onto the middle platen 4 of the heating chamber.

At this stage, C2 not only actuates V6 as aforesaid, but also closes switch SW1 which starts the timer T cycle and SV1 energization for a predetermined time period, during which the molds M in the curing press have heat and pressure applied thereto, cylinder 11 being actuated by high pressure oil flowing through diaphragm valve DV1.

During this time interval, the platform 6 is lowered by the actuation of V6 by C2 which actuates DV3 to permit low pressure oil to flow into the lefthand end of toggle-actuating cylinder 36 to thus break the toggle linkages 34 to lower the platform 6.

When the platform 6 is in lowered position, the latch 7 hooks over the lefthand edge of the plate 2 which carries the mold M containing the cured articles. The operator then places the hook 8 of the mold-opening mechanism 60 through the mold handle 1 and then depresses the spring-actuated plunger of four-way valve V9, which is connected to an air pressure source, to vent the diaphragm valve DV6 for displacement of oil from the righthand end of the mold-opening cylinder 65 into the sump and to actuate diaphragm valve DV7 so that low pressure oil flows into the lefthand end of said cylinder to raise the hook 8 and thus open the mold. The operator unloads the open mold M and loads uncured stock into the cavities thereof. When pressure is released on V9, DV7 is vented and DV6 is operated to move the piston in said cylinder 65 to the left to lower the hook 8 and thus close the mold. The hook then is disengaged from the mold handle 1.

At the end of the predetermined time period, the timer T de-energizes SV1 with the result that DV1 is operated to drain the platen moving cylinder 11 into the sump. The middle and bottom platens 3 thus descend whereby C3 actuates V7 to ready the circuits for the successive shifting of the reloaded mold M and all of the other molds M by depressing of the plungers of both V3 and V4.

*Operation (Figs. 1–6 and 17)*

Figure 2:
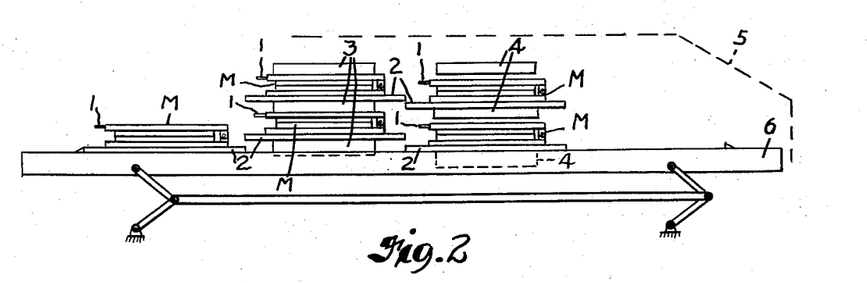

Assuming that the mold M in unloading-loading zone A of Fig. 1 has been loaded with uncured stock and has been closed as shown, and that the molds M in zone B have had heat and pressure applied thereto as in Fig. 2 (bottom and middle platens 3 in down position), the operator initiates automatic operation of the apparatus by pushing in the plungers of the series connected valves V3 and V4 whereby, as already described with reference to Fig. 17, the three bottom molds M are shoved to the Fig. 3 position, the platform 6 is raised to the Fig. 4 position, the three top molds M are shoved to the Fig. 5 position, the platform 6 is lowered to carry the mold M shoved onto zone A thereof down to engage latch 7, and the curing press is actuated through the timer T to clamp two molds M between platens 3 for a prescribed period.

The operator then engages hook 8 with handle 1 of the mold in zone A and depresses the plungers of foot-operated valve V9 whereby the hook 8 is drawn upwardly to open the mold M as shown in Fig. 6. The cured articles are then removed from said mold and uncured stock is loaded thereinto preparatory to repeating the cycle (after platens 3 have been lowered) by again pushing in the plungers of valves V3 and V4.

While it is herein contemplated to manually unload and load the successive molds M, it is possible, and often convenient, to employ so-called "loading frames" which, with the cured articles therein, are removed for replacement by frames previously loaded with uncured stock. It is also contemplated to provide an automatic laterally movable mold unloading and loading mechanism which, for example, may comprise rotary brushes, vacuum cups, or the like which extract cured articles from the open mold M as said elements are laterally moved from one side to the opposite side between the mold sections, and a laterally movable platform which leaves a loading frame between the mold sections or which inserts an uncured sheet of stock between the mold sections, as in the case of molding "O" rings or other sealing rings or gaskets.

In connection with sheet stock, the same may be preliminarily pressed and/or cut to provide thick sections corresponding in size to the articles to be cured, and thin sections joining together said thick sections. Preferably, thick sheet stock is punched out to leave stock in the cavities of a loading frame, each piece having a volume slightly greater than that of the respective cavity to ensure filling thereof when sized in zone B.

Although the present invention has been described in conjunction with a curing press having two movable platens 3 to provide for two stages of heat and pressure application, namely, (a) size and preliminary cure and (b) final cure, the latter need not always be with pressure application. Therefore, this invention may easily be adapted for use with a curing press having only a single movable platen, in which case, heat and pressure effects sizing and preliminary curing, whereas continued and final curing is accomplished with heat alone in the successive stages following the curing press.

Should it be desired to fix the middle platen 3 of the curing press, this may be readily done as by means of additional stop blocks 16 on side plates 14 disposed above said middle platen to prevent upward movement thereof.

Another point which should be borne in mind is that the mold-supporting plates 2 may be dispensed with, especially in cases wherein the molds M have approximately the same dimensions lengthwise of the frame 6. In such case, the bottom mold sections would constitute the elements referred to as "mold-supporting plates" in the appended claims, and the claim language is to be so interpreted in that case.

Other modes of applying the principle of the invention may be employed, change being made as regards the details desscribed, provided the features stated in any of the following claims, or the equivalent of such, be employed.

I therefore particularly point out and distinctly claim as my invention:

1. The combination with a curing press of the type wherein at least two vertically spaced-apart molds are adapted to be positioned between three heating platens, at least two of which platens are relatively movable toward each other; of a verticaly movable mold-supporting platform adapted, in one position, to support a mold on one end thereof for insertion between said two platens and to receive a mold from between said two platens onto the other end; means for changing the elevation of said platform for insertion of a mold on such other end between one of said two platens and the third one of said platens and to receive a mold from between the latter onto such one end; and reciprocating means mounted on said platform for successively shoving molds from and onto the respective ends of said platform as aforesaid.

2. The combination of claim 1 wherein a heating chamber embraces such other end of said platform whereby a mold thereon is maintained in heated condition.

3. The combination of claim 1 wherein heating platens are interposed between such other end of said platform and said press whereby molds are heated after shoved out from between said two platens and after shoved off such other end of said platform.

4. In combination with a multiple platen molding press having three vertically spaced-apart heating platens between the bottom and middle and middle and top ones of which molds are adapted to be positioned to cure rubber and rubber-like stock in said molds; a horizontally extending, vertically movable platform; mold-supporting plates longitudinally movably supported on said platform for movement in one direction therefrom and thereonto to and from a position between said bottom and middle platens when said platform is in a lower position and for similar movement in the opposite direction to and from a position between said middle and top platens when said platform is in an upper position; platform-actuating means for vertically moving said platform to said lower and upper positions; and reciprocable conveyor means mounted on said platform to engage and move said plates as aforesaid.

5. The combination of claim 4 wherein a multiple-fixed platen heating chamber is disposed adjacent to said press for movement of said plates therethrough to continue the cure in the time interval between movement of said plates from a position between said bottom and middle platens to a position between said middle and top platens.

6. In combination with a multiple platen molding press having three vertically spaced-apart heating platens between the bottom and middle and middle and top ones of which molds are adapted to be positioned to cure rubber and rubber-like stock in said molds; a horizontally extending, vertically movable platform; mold-supporting plates longitudinally movably supported on said platform for movement in one direction therefrom and thereonto to and from a position between said bottom and middle platens when said platform is in a lower position and for similar movement in the opposite direction to and from a position between said middle and top platens when said platform is in an upper position; platform-actuating means for vertically moving said platform to said lower and upper positions; and reciprocable conveyor means mounted on said platform to engage and move said plates as aforesaid, said platform-actuating means comprising toggle linkages pivotally connected at one end to said platform and pivotally connected at the other end to fixed points, and longitudinally movable members connected to said linkages to position the links thereof in angular and aligned relation to move said platform down and up.

7. In combination with a multiple platen molding press having three vertically spaced-apart heating platens between the bottom and middle and middle and top ones of which molds are adapted to be positioned to cure rubber and rubber-like stock in said molds; a horizontally extending, vertically movable platform; mold-supporting plates longitudinally movably supported on said platform for movement in one direction therefrom and thereonto to and from a position between said bottom and middle platens when said platform is in a lower position and for similar movement in the opposite direction to and from a position between said middle and top platens when said platform is in an upper position; platform-actuating means for vertically moving said platform to said lower and upper positions; and reciprocable conveyor means mounted on said platform to engage and move said plates as aforesaid, said conveyor means comprising longitudinally movable pusher blocks which engage an edge of an adjacent plate on said plateform to move said plate as aforesaid, and means to reciprocate said pusher blocks.

8. In combination with a multiple platen molding press having three vertically spaced-apart heating platens between the bottom and middle and middle and top ones of which molds are adapted to be positioned to cure rubber and rubber-like stock in said molds; a horizontally extending, vertically movable platform; mold-supporting plates longitudinally movably supported on said platform for movement in one direction therefrom and thereonto to and from a position between said bottom and middle platens when said platform is in a lower position and for similar movement in the opposite direction to and from a position between said middle and top platens when said platform is in an upper position; platform-actuating means for vertically moving said platform to said lower and upper positions; and reciprocable conveyor means mounted on said platform to engage and move said plates as aforesaid, said conveyor means comprising pusher blocks longitudinally movable on said platform to engage and move said plates, the plates in said press being moved onto said platform by adjacent plates acted on by said pusher blocks.

9. Apparatus for molding rubber and rubber-like articles comprising a press equipped with relatively movable heating platens between which a mold is adapted to be clamped to apply heat and pressure to uncured stock in the cavity thereof, means providing an adjacent heating zone wherein the initial curing of the stock in said press is continued under application of heat, means providing a loading station whereat cured articles are adapted to be removed from the mold and uncured stock is adapted to be loaded thereinto, and conveyor means mounted on said means providing a loading platform for successively moving a loaded mold from said loading station into said press for sizing the stock and initiating the cure, thence into said heating zone to maintain the mold under heat to continue the cure, back into the press to effect final cure under heat and pressure, and then back to said loading station for removal of the cured article from the mold.

10. The combination with a curing press of the type wherein at least two vertically spaced-apart molds are adapted to be clamped between three heating platens at least two of which platens are relatively movable toward each other and toward the third; of a vertically movable mold-supporting platform adapted, in one position, to support a mold on one end thereof for insertion between the first and second of said platens and to receive a mold from between said first and second platens onto the other end; means for changing the elevation of said platform for insertion of a mold on such other end between the second and third of said platens and to receive a mold from between the latter onto such one end; and reciprocable means mounted on said platform for successively shoving molds from and onto the respective ends of said platform as aforesaid.

11. The combination of claim 10 wherein a heating chamber embraces such other end of said platform whereby a mold thereon is maintained in heated condition.

12. The combination of claim 10 wherein heating platens are interposed between such other end of said platform and said press whereby molds are heated after shoved out from betwen said first and second platens and after shoved off such other end of said platform.

References Cited in the file of this patent

UNITED STATES PATENTS

| | | |
|---|---|---|
| 1,733,706 | Widin | Oct. 29, 1929 |
| 2,027,165 | Grubman | Jan. 7, 1936 |
| 2,463,560 | Rempel | Mar. 8, 1949 |
| 2,757,414 | Chaloupka | Aug. 7, 1956 |

FOREIGN PATENTS

| | | |
|---|---|---|
| 693,849 | France | Sept. 2, 1930 |